United States Patent
Czajkowski (10) Patent No.: US 10,909,254 B2
(45) Date of Patent: Feb. 2, 2021

(54) OBJECT LEVEL ENCRYPTION SYSTEM INCLUDING ENCRYPTION KEY MANAGEMENT SYSTEM

(71) Applicant: David R Czajkowski, Encinitas, CA (US)

(72) Inventor: David R Czajkowski, Encinitas, CA (US)

(*) Notice: Subject to any disclaimer, the term of this patent is extended or adjusted under 35 U.S.C. 154(b) by 215 days.

(21) Appl. No.: 15/706,619

(22) Filed: Sep. 15, 2017

(65) Prior Publication Data
US 2019/0087595 A1    Mar. 21, 2019

(51) Int. Cl.
| | |
|---|---|
| H04L 9/00 | (2006.01) |
| G06F 21/62 | (2013.01) |
| H04L 9/08 | (2006.01) |
| H04L 29/06 | (2006.01) |
| G06F 21/60 | (2013.01) |
| H04L 9/32 | (2006.01) |
| H04L 9/14 | (2006.01) |

(52) U.S. Cl.
CPC ........ *G06F 21/6209* (2013.01); *G06F 21/602* (2013.01); *G06F 21/6227* (2013.01); *H04L 9/083* (2013.01); *H04L 9/0822* (2013.01); *H04L 9/0833* (2013.01); *H04L 9/14* (2013.01); *H04L 9/3226* (2013.01); *H04L 9/3231* (2013.01); *H04L 63/0428* (2013.01); *H04L 63/0442* (2013.01); *H04L 63/06* (2013.01); *H04L 63/061* (2013.01); *G06F 2221/2107* (2013.01); *H04L 63/062* (2013.01); *H04L 63/08* (2013.01); *H04L 63/101* (2013.01)

(58) Field of Classification Search
CPC .................................................. G06F 21/6209
See application file for complete search history.

(56) References Cited

U.S. PATENT DOCUMENTS

| | | | |
|---|---|---|---|
| 9,485,229 B2 | 11/2016 | Czajkowski | |
| 2006/0206485 A1 | 9/2006 | Rubin et al. | |
| 2008/0133935 A1 | 6/2008 | Elovici et al. | |
| 2009/0177894 A1* | 7/2009 | Orsini ................ | G06F 21/6209 713/193 |
| 2013/0191650 A1* | 7/2013 | Balakrishnan ...... | G06F 21/6227 713/190 |
| 2014/0101438 A1* | 4/2014 | Elovici ................ | H04L 63/08 713/155 |

* cited by examiner

*Primary Examiner* — Taghi T Arani
(74) *Attorney, Agent, or Firm* — Continuum Law; Robert P. Cogan (57) ABSTRACT

Parties are enabled to exchange data without knowing the other party's encryption key. Cells in one party's database each form an object which is encrypted at the object level. Authentications and authorizations are incorporated into each object. An encryption management engine produces different keys for each objects. A security server database stores a key registered by one party. The in a later request by the party is compared to its registered key. A protocol and key management method allow identification and access to an appropriate key using only publicly available information. A set of data is added with a secured session key. A selected set of data is used to create a cryptographically secure Header-Tx with a secured session key and an Access Control List with an embedded security policy. Data is sent to a receiver only when authorized by the customer authentication security server.

10 Claims, 10 Drawing Sheets

| | |
|---|---|
| $MSG_V$ | MESSAGE NUMBER |
| $ATCH_V$ | MESSAGE ATTACHMENT NUMBER |
| $HWID_N$ | HARDWARE ID NUMBER (COULD BE SERIAL NUMBER, PHONE NUMBER, SIM CARD, UNIQUE TO HW, ETC) |
| CLEARANCE | CLEARANCE LEVEL REQUIRED TO READ MESSAGE (MILITARY EXAMPLE: SECRET, TOP SECRET, SCI, ETC.; COULD HAVE COMMERCIAL EQUIVALENT) |

| | |
|---|---|
| $BIO_D$ | BIOMETRIC DATA OF THE SENDER-DEVELOPER |
| $PASS_D$ | PASSWORD SUBMITTED BY SENDER-DEVELOPER |
| $GUID_{ADM}$ | GLOBALLY-UNIQUE ID OF THE ADMINISTRATOR |
| $BIO_{ADM}$ | BIOMETRIC DATA OF THE ADMINISTRATOR |
| $PASS_{ADM}$ | PASSWORD SUBMITTED BY ADMINISTRATOR |
| $SW_{ST}$ | SOFTWARE ID NUMBER |
| $SW_T$ | SOFTWARE TITLE |
| $SW_{ATH}$ | SOFTWARE AUTHOR |
| $SW_V$ | SOFTWARE VERSION NUMBER |
| $BIO_R$ | BIOMETRIC DATA OF THE RECEIVER |
| $PASS_R$ | PASSWORD SUBMITTED BY RECEIVER |
| $GUID_R$ | GLOBALLY-UNIQUE ID OF THE RECEIVER |
| $CPU_D$ | GLOBALLY-UNIQUE ID OF THE DEVELOPERS CPU |
| $CPU_{ADM}$ | GLOBALLY-UNIQUE ID OF THE ADMINISTRATOR'S CPU |
| $CPU_R$ | GLOBALLY-UNIQUE ID OF THE RECEIVER'S CPU |
| $GUID_{GR1}$ | GROUP ID OF THE ADMINISTRATOR |
| $GUID_{GR2}$ | GROUP ID OF THE RECEIVER |
| $CPU_{GRADM}$ | GROUP ID OF THE ADMINISTRATOR'S CPU |
| $CPU_{GRR}$ | GROUP ID OF THE RECEIVER'S CPU |
| $TM_V$ | TIME SOFTWARE ACCESS IS VALID |
| $DT_V$ | DATE SOFTWARE ACCESS IS VALID |
| $TM_{ACT}$ | ACTUAL TIME |
| $DT_{ACT}$ | ACTUAL DATE |
| $VESTING_D$ | CASS DOMAIN FORM DEVELOPER |
| $VSDOM_{ADM}$ | CASS DOMAIN FROM ADMINISTRATOR |
| HASH | ADD APPROPRIATE HASH VALUES TO HEADERS (DONE WITH THE MP EQUATION) |
| $S_O, S_o$ | SESSION KEYS FOR ENCRYPTION AND AUTHENTICATION OF THE CONTENT OF THE MESSAGE |
| $K_{A3}, K_{A4}$ | LONG-TERM ENCRYPTION AND AUTHENTICATION KEYS OF THE ADMINISTRATOR |
| $K_{A5}, K_{A6}$ | LONG-TERM ENCRYPTION AND AUTHENTICATION KEYS OF THE RECEIVER |
| ACT | ACCESS CONTROL LIST CONTAINING PRIMARY EMAIL ADDRESSES OF RECIPIENTS |

VARIABLES CAN BE DEFINED USING ANY PARTICULAR FIXED AND WELL COMMUNICATED METHOD

USERS TABLE

| USERNAME | EMAIL | CUPUID | CLEARANCE | PASSWORD | BIOMETRIC |
|---|---|---|---|---|---|
| BOB | BOBE@A.C | 5545 | SECRET | BOB123 | F345A789 |
| BILL | BILLE@B.C | 11243 | UNCLASSIFIED | BILL12328 | E123C1 |
| SAM | SAMAD@A | 665446 | TOP SECRET | SAM123 | 7788990A |
| JIM | JIME@I.CO | 7777 | SECRET | JIM23 | 123C2799 |

OBJECT LEVEL ENCRYPTION SYSTEM INCLUDING ENCRYPTION KEY MANAGEMENT SYSTEM

FIELD

The present subject matter relates generally to database encryption and more particularly to providing encrypted objects within selected cells or all cells of a database wherein an intrusion into a system accesses only unusable data from cells containing encrypted objects.

BACKGROUND

In a secure system, data needs to be protected both at rest and in motion. Data is protected by encryption. There are many ways to intrude into a database system. Access is often controlled by rules. Rule-based access protocols are often defeated. Effectivity depends on a number of factors. If not implemented in a robust system design, encryption might not be effective. A common form of protection is PGP, Pretty Good Privacy, which uses symmetric and asymmetric encryption keys. Key management is essential to make PGP effective. In addition, entities authorized to enter a system may seek to exceed their permissions once they are in the system. Once a firewall is breached, an intruder may roam through various locations with impunity.

The problem of breaking into a computer system was recognized by the United States Government leading to the creation of national security defense directive, NSDD-145, *National Policy on Telecommunications and Automated Information Systems Security*, Sep. 17, 1984. This directive recognized that computers used by government agencies and others were " . . . highly susceptible to interception, unauthorized electronic access, and related forms of technical explanation." Today, over 30 years later, significant exposure still exists.

Unpredictability of keys in symmetric and asymmetric encryption systems increases security against intruders. Keys, once generated, must be managed. Successful key management is critical to the security of a cryptosystem. Key management is the management of cryptographic keys in an encryption system at the user node level, either between user nodes or systems. Procedures support key establishment and maintenance of ongoing keying relationships between security nodes. The procedures may include functions such as replacing or canceling keys. Several key management change schemes exist, which support different communication flows. Private and public key based schemes are focused on particular features. Symmetric schemes generally impose a lower computational and network overhead. Pre-distributed keys must be provided, and the keys must not be compromised. A suitable key revocation system must be in place in the event of compromise. Conversely, in asymmetric schemes, no secret keys need to be distributed. The primary critical issues are the authenticity of the public keys, which must either be established by a certificate authority (CA) or by public key predistribution and the high computational overhead of the public key algorithms.

Key management systems manage access to networks, databases, and processors. In operation, an encryption key is utilized in a key management system to apply a set of complex algorithms to translate data into unintelligible streams of alphanumeric characters. Tasks to be managed include generation, exchange, storage, use, and replacement of keys. Key management is also achieved through cryptographic protocol design, key servers, user node procedures, and other relevant protocols.

In terms of human performance, key management is the most difficult aspect of cryptography because it involves system policy, user training, organizational and departmental interactions, and coordination between all of these elements. Difficulty, expense, and human inertia often lead to laxity in constant, complete maintenance of a key management system. Unless the key management procedures are scrupulously followed, odds of penetrating a network are increased. Therefore, users at system nodes may present a security threat to their own systems.

United States Patent Application Publication No. 20080133935 discloses a database in which a database cell is encrypted with its unique position. One or more encryption keys are received by a client from an authentication server. Each encryption key is relevant for performing at least one query of said client, according to the client's permissions. Permissions must come from the authentication server. A client who is entering information does not create permissions which are then authenticated by the identity of another client requesting access. No method is provided for leaving selected cells unencrypted in order to reduce required resources.

United States Patent Application Publication No. 20060206485 discloses a method for providing access to a database which provides user nodes with a set of user node access tokens, retrieving permission information associated with each user node access token, and providing access to the data that is associated with the selected portion of the permission information. Keys must be generated dynamically based on the information to be accessed. Rigorous authentication is not provided. Encryption is not provided.

SUMMARY

Briefly stated, in accordance with the present subject matter, a method is provided in which different sets of data are each respectively protected by a different cryptographic session key and a different arbitrary number, namely an initialization vector, or nonce.

A database structure is provided in which objects in separate cells or groups of cells are encrypted individually. Separate sets of authentications and authorizations are created and then incorporated into the object. Access to selected locations is provided. An entire data stream does not need to be encrypted. Encryption is provided at the object level. This is object level encryption (OLE). This structure and method provide, in effect, an object level firewall. This object level firewall protects objects even if a firewall protecting a database is breached.

The database is in a server that is coupled for access by clients. The clients may be originators of objects stored in the database, user nodes accessing the objects, or both. Data to be sent is encrypted at the object level. An encryption management engine produces different keys for each cell or range of cells within the database.

The database server is used in conjunction with the security server for authentication. The security server stores keys registered by a client. The security server preferably includes an encrypted database. When a client requests access to the database, the request is sent to the security server. The request is compared to registered keys in a security server hardware encrypted database. An encryption management engine produces different keys for each cell or range of cells within the database. Individual fields are encrypted rather than an entire file. A firewall is provided that is effective at the object level. Object-level protection is provided even if a server firewall is breached.

A protocol and key management method allow a sender to identify a recipient and access an appropriate key using only publicly available information. A source generates a random symmetric session key and encrypts data at the object level with the key. The source selects a party, parties, or a particular group of parties that are authorized to have access to the encrypted data by specifying client IDs. Each client ID is a Public Identity Variable (PIV). Only public identity of a receiving party or group must be known. Client IDs can be created to define a group of recipients. In this manner, separate encrypted messages need not be sent to each group member. In order to register each key to correspond to its unique owner or group, the customer authentication security server receives and stores each party's key. Two or more parties are enabled to exchange and manipulate data without knowing the other party's encryption key.

A client who will send data to the database selects a set of "Security Policy" variables which will be controlled. A set of data is added with a secured session key. A selected set of data is used to create a cryptographically secure Header-Tx with a secured session key and an Access Control List with an embedded security policy.

Data is sent to a receiver via the customer authentication security server. The server uses variables for authentication such as the network location of the recipient, GPS location, time of day, receiver passwords, receiver biometrics, messaging data document number, and other available identifiers. Attributes of identification and management of keys can be changed during use.

The customer authentication security server senses whether authentication succeeds or fails. The customer authentication security server can take positive actions beyond simply refusing access to the unauthenticated recipient.

BRIEF DESCRIPTION OF THE DRAWINGS

The present subject matter may be further understood by reference to the following description taken in connection with the following drawings:

FIG. 9 is a chart illustrating exemplary parameters that may be included in authentication variables;

DETAILED DESCRIPTION

In accordance with the present subject matter, a method is provided for encrypting and decrypting an object sent by one party to the database and retrieved from the database by another party. The object is electronic data. Examples of objects include files, video streams, images, messages, e-mails, virtual private network (VPN) security keys, text data, or numeric data, and VPN session keys. The objects may be sent and received by computers operating independently, computers operated by a user node, smart phones, radios, or servers. The system utilizes object level encryption (OLE). For object-level encryption, the representation of each object is decrypted before opening it, and encrypted after closing it.

Encryption keys are transferred in order that an intended party can decrypt an object that was encrypted by a party sending objects to the database. Each party has a unique secret key. A management method and system are provided in which the sender's and the recipient's keys are stored in a security server. The sender may transmit data encrypted with the sender's key and identify the recipient only with publicly available information. The recipient's public identity can comprise one or more unique identifiers. Examples of unique identifiers are processors or hardware public serial numbers and names, Internet Protocol (IP) addresses, e-mail addresses, and telephone numbers. Public identities may also be used for groups. Two or more parties can transfer, store, or reject encrypted information without knowing the other party's encryption key.

The present method comprises steps which can be done separately with respect to user nodes and servers discussed below. Many data structures may be created before or after other data structures are formed. Data operations need not necessarily be done in a specific order. Therefore, the method may be performed in an order that may differ from statements in the specification and claims unless illogical. The specification and the claims are intended to describe all logical orders.

Figure 1:
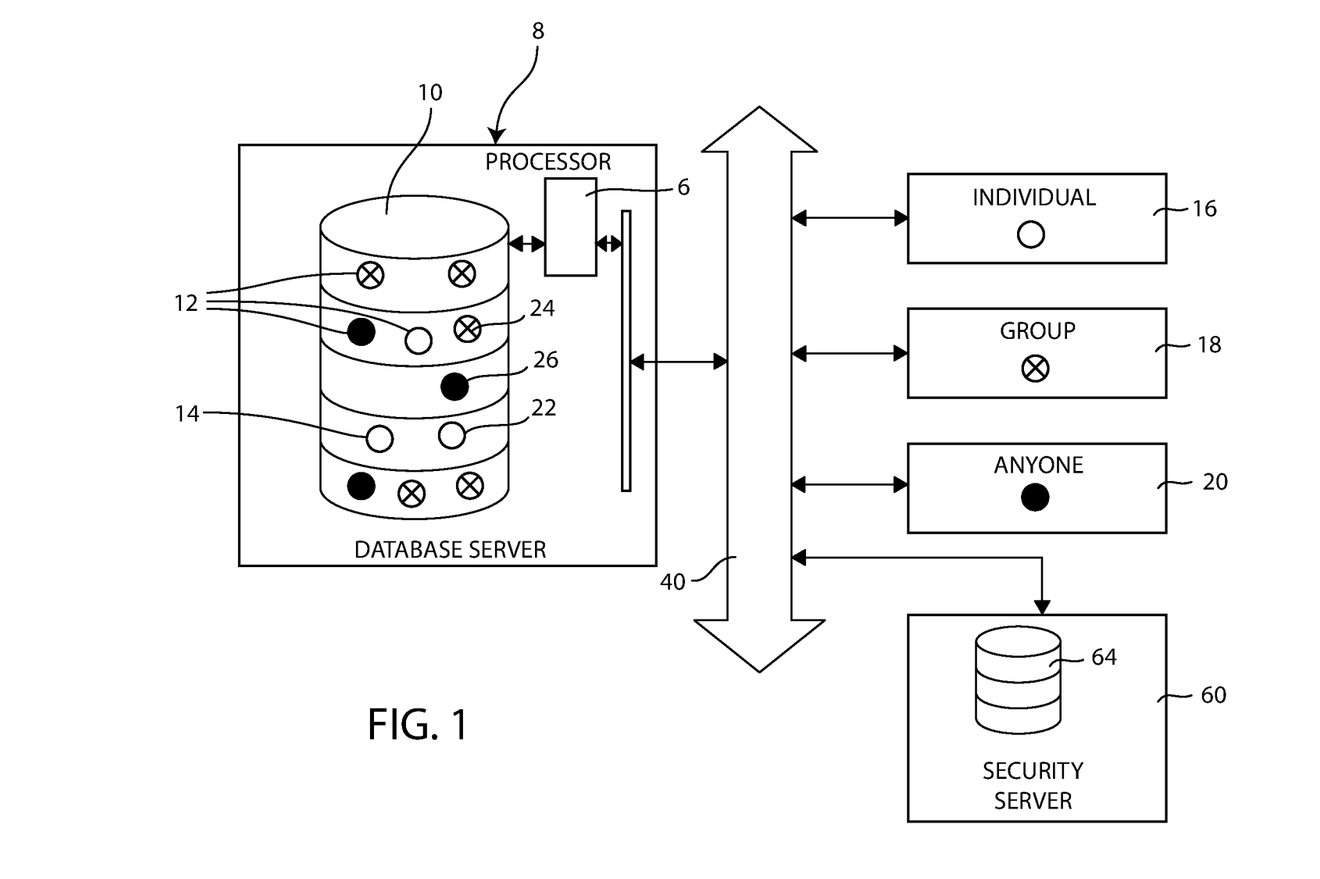
FIG. 1 is a block diagram of a database protected in accordance with the present subject matter.

FIG. 1 is a block diagram of a database protected in accordance with the present subject matter. A database 10 is included in a database server 8. The database server 8 includes a processor 6 which performs the operations described herein. The database 10 comprises cells 12. Each cell 12 may house an object 14. The object 14 is virtually any type of electronic data, for example, files, video streams, images, messages, e-mails, virtual private network (VPN) keys, data streams, and many other forms of intelligence. Permissions to access encrypted data are also selectable. The database 10 may be in one location or may be distributed. In accordance with the present subject matter, individual cells 12 may be encrypted with data enabling access to selected entities or may be left unencrypted. Leaving cells unencrypted where security is not necessary decreases resources required of a system. Access to particular cells can be limited if desired, whether or not a cell is encrypted.

When the database server 8 has received a request for an object, the database server 8 requests authentication from a security server 60. The security server 60 is a customer authentication security server (CASS). The term CASS in the present description is also used as an adjective to indicate things that interact with security server 60.

Figure 2:
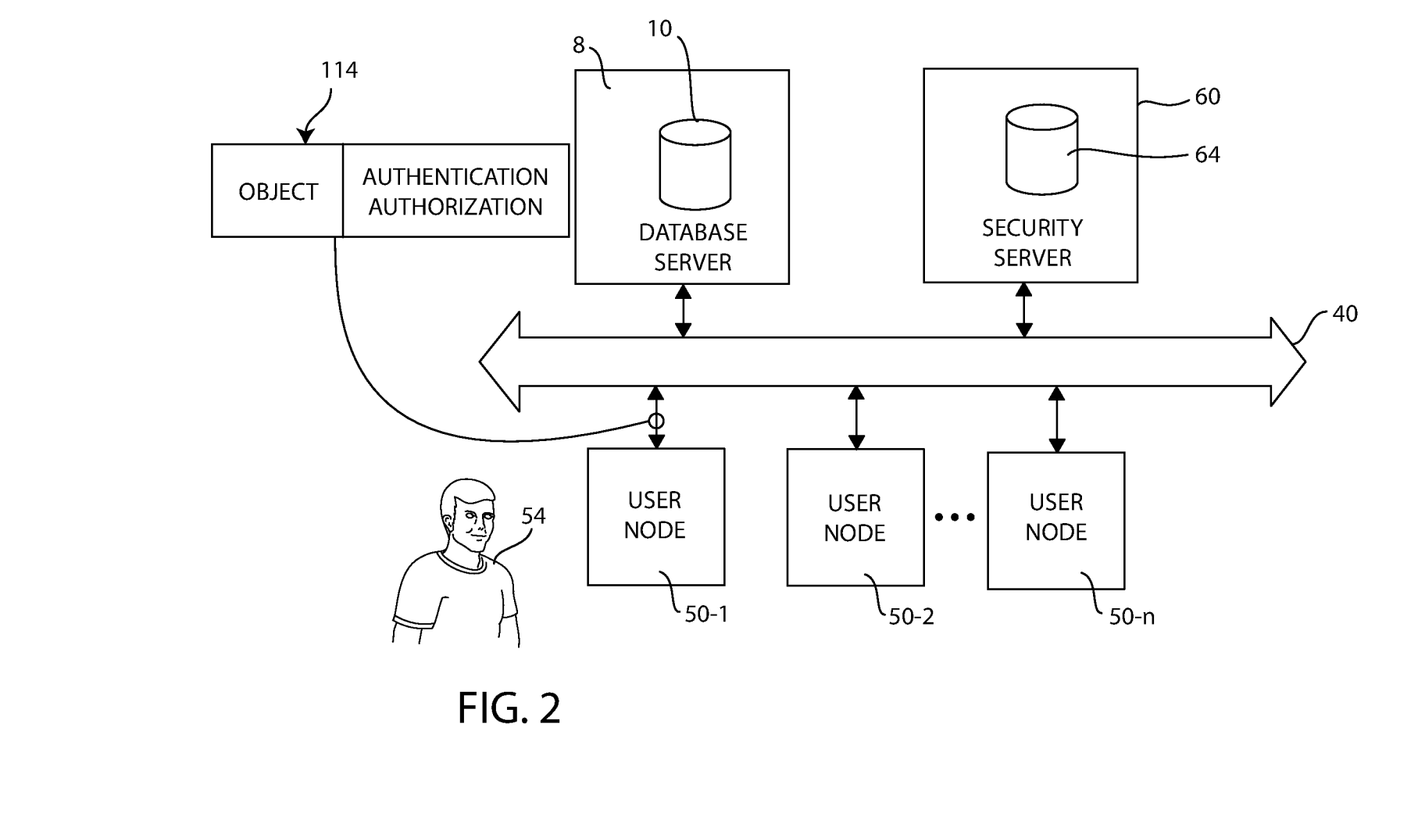
FIG. 2 is a block diagram of the system utilizing the present subject matter incorporating a database and a security server.

In the present illustration, exemplary entities 16, 18, and 20 are illustrated. Each entity 16, 18, or 20 interacts via a user node 50 (FIG. 2). The entity 16 represents an individual. The entity 18 represents a group of clients, and the entity 20 represents all persons having access to the database 10. The cells 12 may each comprise a cell type 22, 24, or 26. Cells 22 are marked with an open circle and provide permission only to the entity 16. Cells 24 are marked with a circle including an X and are accessible only to entity 18. Cells 26 are marked with a dark circle and are unencrypted. Since objects may be protected individually, this arrangement acts as an object level firewall. The entity 18 may comprise one or more subgroups.

Figure 3:
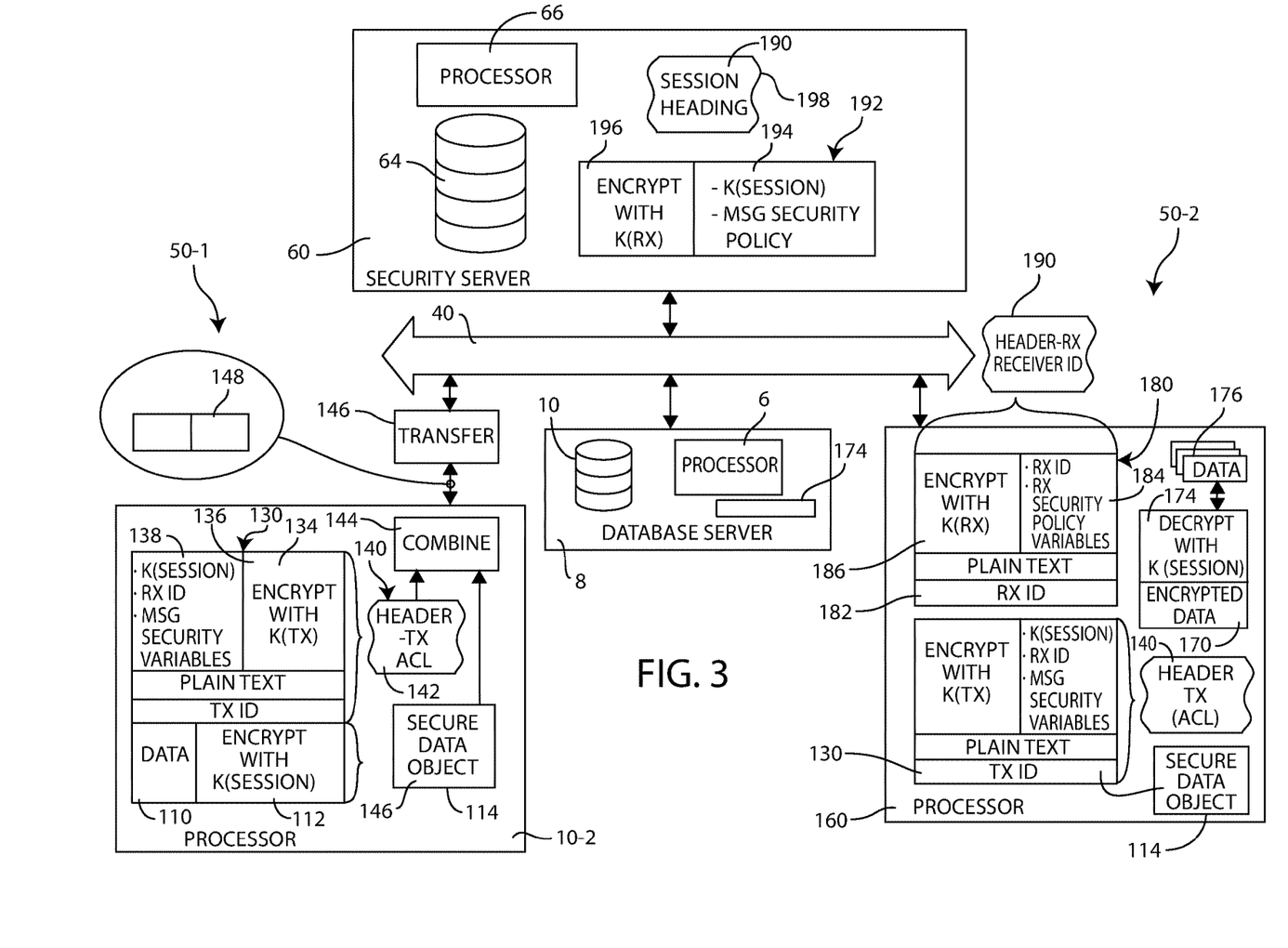
FIG. 3 is a block diagram of the system of FIG. 2 illustrating object level encryption details.

FIG. 2 is a block diagram of the system utilizing the present subject matter incorporating a database and a security server. FIG. 3 is a block diagram of the system of FIG. 2 illustrating object level encryption details. FIG. 2 and FIG. 3 are taken together. In the present illustration, an object is sent from the user node 50-1 to the database 10. The user node 50-2 will seek to retrieve this object from the database 10. In this illustration, the user node 50-1 could be viewed as a transmitter and the user node 50-2 would be viewed as a receiver. Communications between user nodes and servers are made via a network 40. Additionally, restrictions and permissions may be allowed to be made by an administrator at a further user node 50.

The user node 50-1 comprises a processor 102 (FIG. 3). An object 12 is selected by a user at the user node 50-1. At a data location 110, the object 12 is encrypted with a key from a key generator 112 to provide secure object data 114. The secure object data 114 comprises the encrypted object 12. This process is referred to as object level encryption. A transmitter ID, TxID, is stored in plaintext in a transmitter header generation module 130 at a location 132. In location 134, a data package 136 is stored. The data package comprises a session key K(session) 138, receiving party identification RxID, and message security variables. Message security variables are discussed below. This data package is encrypted with a transmission key, KTx, to provide an encrypted transmission header, Header-Tx, 140 at a register location 142. Header-Tx 140 also comprises an access control list (ACL). The Header-Tx 140 and the secure object data 114 are combined by transmission data interface circuit 144 to provide a protected transmission packet 148. A data transfer unit 146 provides an output from the user node 50-1 for transfer to the database server 10. The transfer is made by the network 40.

The user node 50-2 comprises a processor 160. The processor 160 receives a protected transmission packet 148 from the database server 10. The protected transmission packet 148 is separated into a Header-Tx 140 and the secure object data 114. The Header-Tx 140 is stored for use in authentication. Authentication is performed as described with respect to FIG. 6 below. If authentication is successful, the key K(session) will be provided from location 174 to the processor 160 in the user node 50-2.

The processor 160 creates its own header, Header-Rx 190. The Header-Rx 190 is generated in a receiver header generation module 180. A location 182 includes the identity, RxID, of the user node 50-2 in plaintext. The RxID and receiver security policy variables at a location 184 are encrypted with a receiver key K(Rx) at a location 186. After the database 10 receives the encrypted data package 148 from the user node 50-1, the use node 50-2 may request access to the encrypted data package 148 from the database server 10.

To this end, the database 10 requests authentication of the requesting user node 50. The database server 10 transmits Header-Tx 140 and Header-Rx 190 to the security server 60. The security server 60 comprises a hardware encrypted database 64 and a processor 66 which performs the operations described herein. The hardware encrypted database 64 looks up KTx and KRx, which have been provided to the database 160 as described with respect to FIG. 5. The Header-Tx 140 and the Header-Rx 190 are compared. If authentication is successful, as described below, the security server 60 sends a data structure 192 including a data block 194 and a data block 196. The data block 194 includes the session key K(session). Data block 194 comprises security policy. The data block 196 includes KRx. Data in block 194 is encrypted with KRx in block 196 to provide a session heading 198.

The transmitter ID, TxID, as previously mentioned, is stored in plaintext by the database server 10 along with the Header-Tx 140 in an operating data storage location. Similarly, the session key is stored in that database 10 in the operating data storage location along with the session key K(session) from location 138. The data package 136 has been encrypted by the key generator 112 using a transmission key, KTx, to provide an encrypted transmission header, Header-Tx 140 at a location 142. The data transfer unit 146 has provided an output from the user node 50-1, to the network 40 for transfer to the database 10. The protected transmission packet 148 is separated into the Header-Tx 140 and the secure object data 114 in the database server 8. The Header-Tx 140 is stored for use in authentication.

The user node 50-2 comprises a processor 160. In the present illustration, a user 50-2 seeks to obtain data from the database 10. The processor 160 sends a request to the database 10. Authentication is performed as described with respect to FIG. 6 below. If authentication is successful, the key K(session) will be provided from a location 174 in the database server 8. In other embodiments, the location 174 could be included in the database server 8 or the security server 60. Decrypted data is provided to a data output module 176 in the processor 160.

The processor 160 creates its own header, Header-Rx 190. The Header-Rx 190 is generated in a receiver header generation module 180 in the processor 160. A location 182 includes the identity, RxID, of the user node 50-2 in plaintext. RxID and receiver security policy variables, defined below, at a location 184 are encrypted with a receiver key K(Rx) at a location 186. After receiving the encrypted data package 148 from the user node 50-2 to the database server 8, the database server 8 requests authentication from the security server 60.

To this end, the user node 50-2 transmits Header-Tx 140 and Header-Rx 190 to the database server 8. As illustrated and described in further detail below, the security server 60 comprises a hardware encrypted database 64. The hardware encrypted database 64 looks up KTx and KRx, which have been provided to the database 64 as described below with respect to FIG. 5. The Header-Tx 140 and the Header-Rx 190 are compared to values that have been registered in the hardware encrypted database 64. If authentication is successful, as described below, the security server 60 sends a data structure 192 including a data block 194 and a data block 196 to the database server 8. The data block 194 includes the session key K(session). Data block 194 comprises security policy and reaction responses. The data block 196 includes KRx. The database server 8 transmits an encrypted object to the user node 50-2 along with authorization to decrypt.

Communications from the security server to a user node 50 or the database server 10 are made by a secure transmission link, such as SSL (Secure Sockets Layer). This link ensures that all data passed between the user nodes 50 and the servers 8 and 60 remain private and integral.

Figure 4:
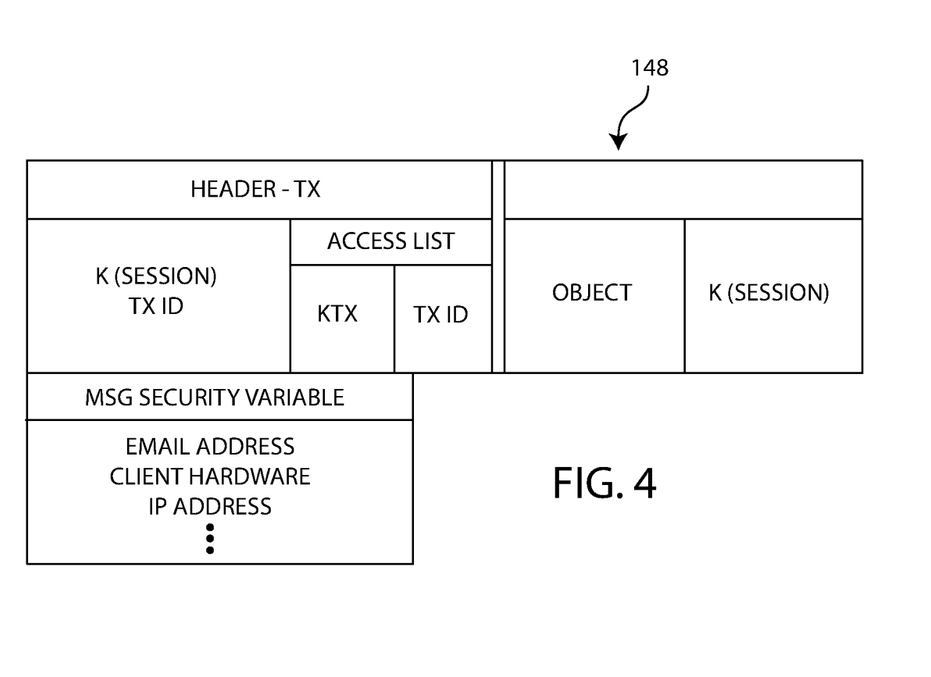
FIG. 4 is a diagram of the structure of a protected transmission packet.

FIG. 4 is a diagram of the structure of the protected transmission packet 148. The protected transmission packet 148 is provided from the transmission data interface circuit 144 (FIG. 3). The components of the protected transmission packet 148 are ordered in accordance with a selected communications protocol. Any order of components may be utilized so long as a compatible protocol is utilized.

After the database server 8 has sent the data structures to the security server 60, authentication is performed. The database server 8 sends the Header-Tx as received from the user module 50-1. The database server 8 sends the Header-Rx as received from the user node 50-2. If authentication is successful, the security server 60 will provide a session key 138 to the user node 50-2 for decrypting an object 22 (FIG. 1) delivered from the database 10.

Figure 5:
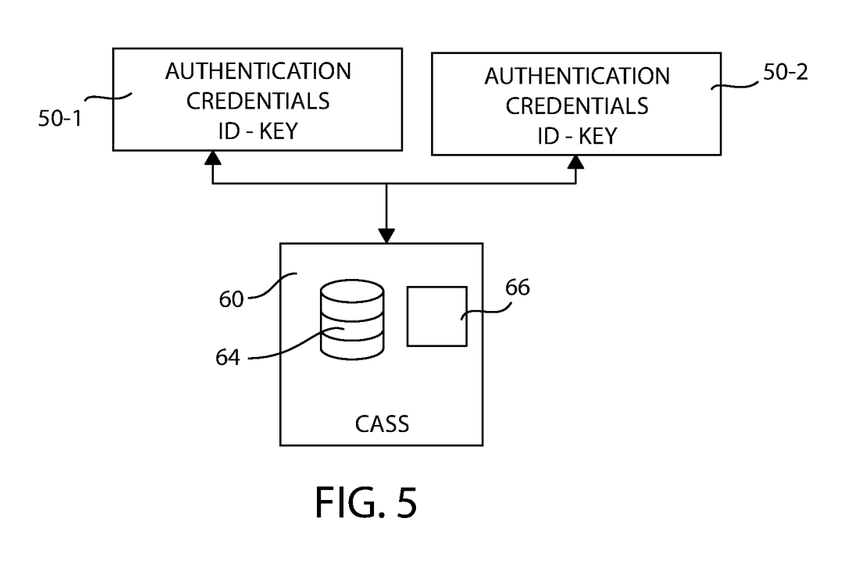
FIG. 5 is a diagram illustrating loading of a first user node's key and a second user node's key to a relational database within the security server.

FIG. 5 is a diagram illustrating loading of the user node 50-1 key and the user node 50-2 key to the hardware encrypted database 64 in the security server 60. This operation is performed prior to transmission of data to the database 10 by the user node 50-1. Keys may be changed at the option of each user node 50. First time individual secret symmetric key registration of each party can be made in a number of different ways. Keys can be created using a random number generator to create a random number which will comprise the key stored to software memory. Additional encryption details selected from a set of selectable encryption details such as in FIG. 9 below can also be registered.

Figure 6:
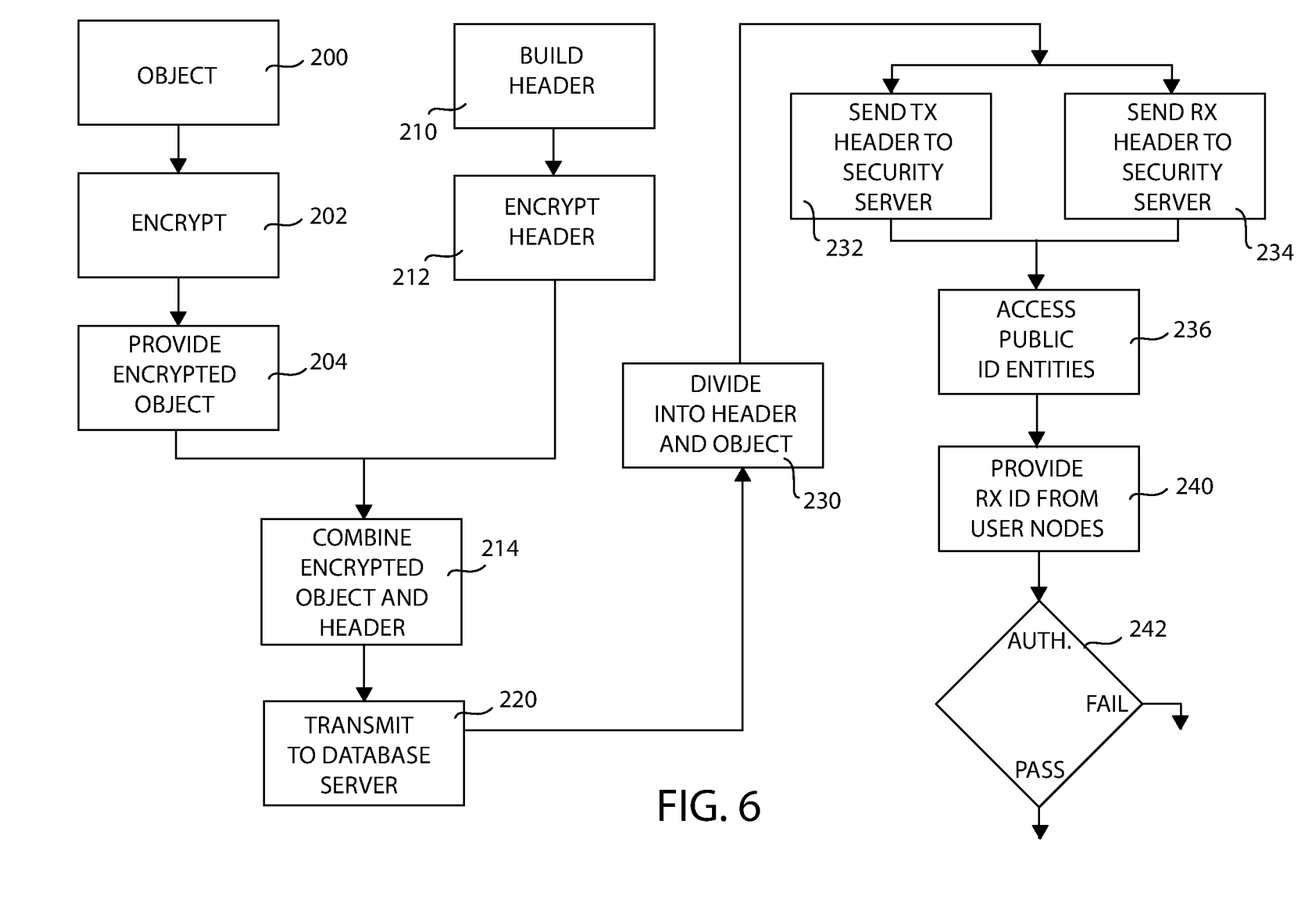
FIG. 6 is a flowchart illustrating the software and method for authentication in the security server.

FIG. 6 is a flowchart illustrating the software and method for authentication in the security server 60. At block 200 an object 12 is loaded in a data location 110 (FIG. 3). The object 12 could comprise, for example, files, video streams, a streaming signal, text data, images, messages, e-mails, virtual private network (VPN) security keys, numeric data, or VPN session keys, At block 202, the object 12 is encrypted. At block 204, the secure data object 114 is provided.

At block 210, a data package is built. The initiation of block 200 and block 210 are within a time window such that the Header-Tx 140 and the secure object data 114 can be combined and transmitted together. The secure object data package 114 comprises K (session), RxID, and message security variables. This data package is encrypted with the transmission key KTx. Additionally, the data package comprises the user node 50-1's ID in plaintext. At block 214, the Header-Tx 140 and the secure object data 114 are combined to form a transmission package 148, which is sent to the database server 8. At block 220 the transmission package 148 is sent to the database server 8.

Operation on transmission package 148 as received by the database server 8 begins at block 230. The transmission package 148 is divided. The Header-Tx 140 is stripped from the transmission package 148 to be used for authentication. The encrypted object from the secure object 114 is saved. Decryption is performed if authentication succeeds as further described below. Header-Tx 140 is sent to the security server 60 at block 232. Header-Rx 190 is sent to the security server 60 at block 234. At block 236, the public identities of the user node 50-1 and user node 50-2 are identified and used to access the encryption keys that were loaded into the hardware encrypted database 64. The RxID from the Header-Rx 190 and the RxID included in the Header-Tx 140 are provided for comparison at block 240. Comparison may be made at block 242 between a selected plurality of identifying parameters discussed below.

If authentication succeeds, i.e., if there is a match, a requested object 12 is sent to the user node 50-2. The processor 160 utilizes keys to decrypt the object 12 and provide decrypted data at the user node 50-2.

Figure 7:
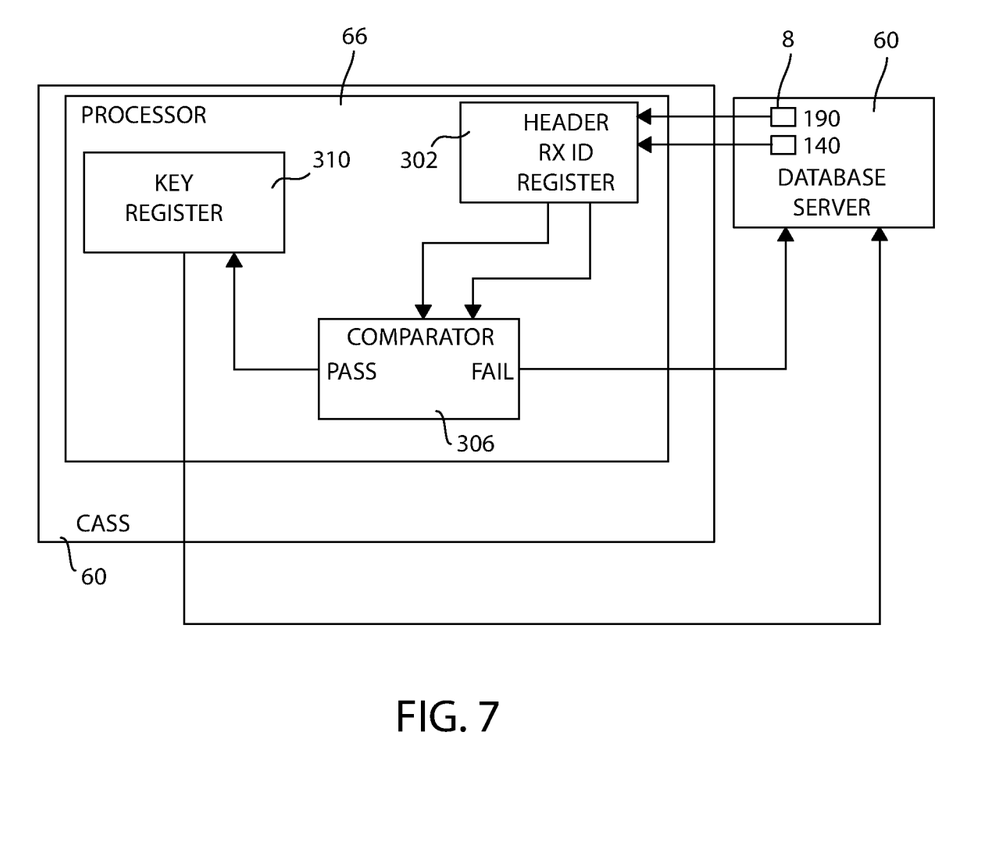
FIG. 7 is a functional block diagram of the security server of FIGS. 1 and 2.

FIG. 7 is a functional block diagram of the security server 60 of FIGS. 1 and 2. The server functionality may be implemented in combinations of hardware (for example integrated circuits) or software. Particular components need not be discrete as illustrated in FIG. 7. For authentication, the security server 60 uses an RxID register 302, a comparator 306, and a key register 310. Header-Tx 140 includes the RxID as transmitted from the transmitter 10 in order to specify the desired user node 50-2. The RxID is transmitted from the Header-Tx 140 to the RxID register 302. The Header-Rx 190 includes the actual RxID of the user node 50-2. Each of the RxIDs is transmitted to the comparator 306. If the two RxIDs match, authentication has succeeded. A signal is provided to the key register 310. The key register 310 provides the Key(session) to the user node 50-2. The Key(session) is used to decrypt the secure object data 114 and provide data at the user node 50-2. If the two RxIDs do not agree, the comparator 306 sends a failure signal to the security server 60 and the database server 8. Access to the requested object is denied.

Figure 8:
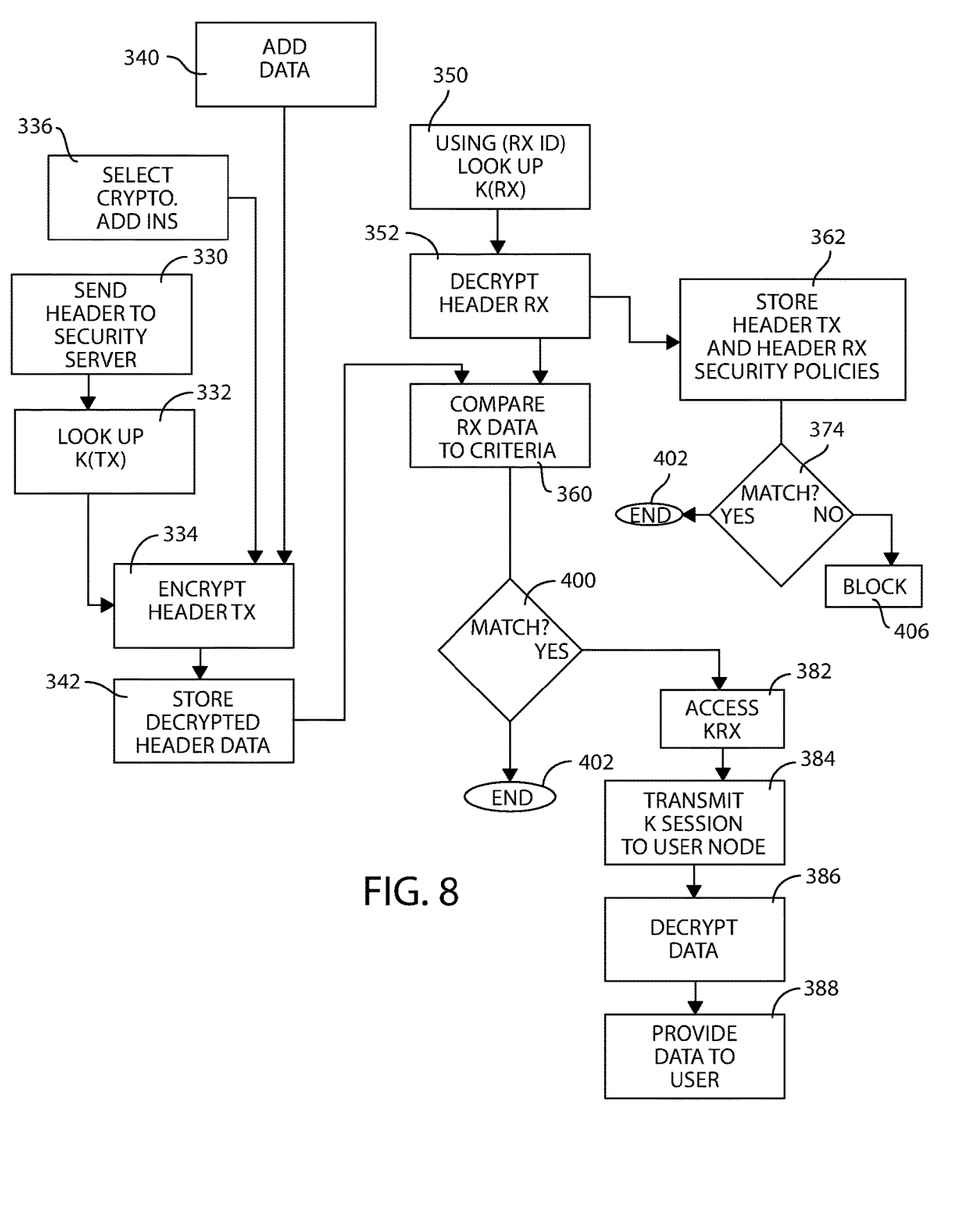
FIG. 8 is a flowchart illustrating the software and method for preparing for authentication in the security server.

FIG. 8 is a flowchart illustrating the software and method for preparing for authentication in the security server 60. Authentication can be provided for a transacted piece of data. Alternatively, authentication can be provided for creation of a communications session. A session can be defined by the system for any selected duration of time. A system user node 50 will select a set of authentication variables. The selected variables can define both authentication requirements and a security policy. This capability is enabled by the object level encryption system. The security policy is passed through a combination of the added authentication variables and/or specific Message Security Policy Variables. In the OLE System, the Message Security Policy Variables are encrypted with the user node 50-1 key K(Tx). The key provides the security server 60 with the proper variables for secure authentication of the user node 50-2 and the user node 50-2 security conditions. This Message Security Policy is encrypted and added as a header to the encrypted data. Security Policy variables can be selected through automated collection of data or can be entered by the clients.

At block 330, the headers containing the RxIDs are sent to the RxID register 302 as described with respect to FIG. 7. The system looks up KTx at block 332. The Header-Tx is encrypted at block 334. Cryptographic add-ins may be added from block 336. Additional data, e.g., signatures, may be added from block 340. The decrypted Header-Tx data, including RxID, is stored at block 342. Similarly, the RxID is used to access KRx at block 350. The Header-Rx is decrypted at block 352 and stored at block 354. The Header-Rx includes a security policy in the form of selected parameters. The decrypted Header-Tx data is provided to the comparator 306 (FIG. 7) for comparison at block 360. Similarly, the decrypted Header-Rx is coupled for comparison at block 360. Comparator criteria are loaded as indicated at block 362. Additionally, Header-Tx and Header-Rx security policy variables are compared at block 370. The RxIDs are evaluated at block 380. If the RxIDs match, operation proceeds to block 382 and KRx is accessed. At block 384 K(session) is transmitted to the user node 50-2. Data is decrypted at block 386 and provided to a client at block 388. At block 370, security policy variables from each Header-Rx and Header-Tx are compared. If a match is found at block 370, the process ends at block 402. If a match is not found, operation proceeds to block 406 where instruction is provided to the database 8 to block access to cells for which security variables did not match.

The OLE protocols enable the addition of authentication requirements to be added into the secure header. Common authentication variables include hardware ID, telephone number, e-mail address, IP address, personnel/client ID, time of day, security clearance level, location, and many other parameters.

FIG. 9 is a chart 500 illustrating exemplary additional parameters that may be included in authentication variables. The authentication variables comprise optional items that can be included in the data package 136 (FIG. 2). These include parameters indicative of senders, biometric data, identification of data, materials, or timestamps. For example, $BIO_D$ is indicative of biometric data of a selected individual, such as the sender of an object. $PASS_D$ indicates a submitted password. TMv indicates an interval limiting time during which a credential will be valid. The chart 500 includes a first column 502 including names of variables. A summary of each variable is listed in a row 506. Column 504 is a description of the corresponding variable in the same row 506. The chart 512 which lists variables that can be defined is shown in FIG. 10.

Figure 10:
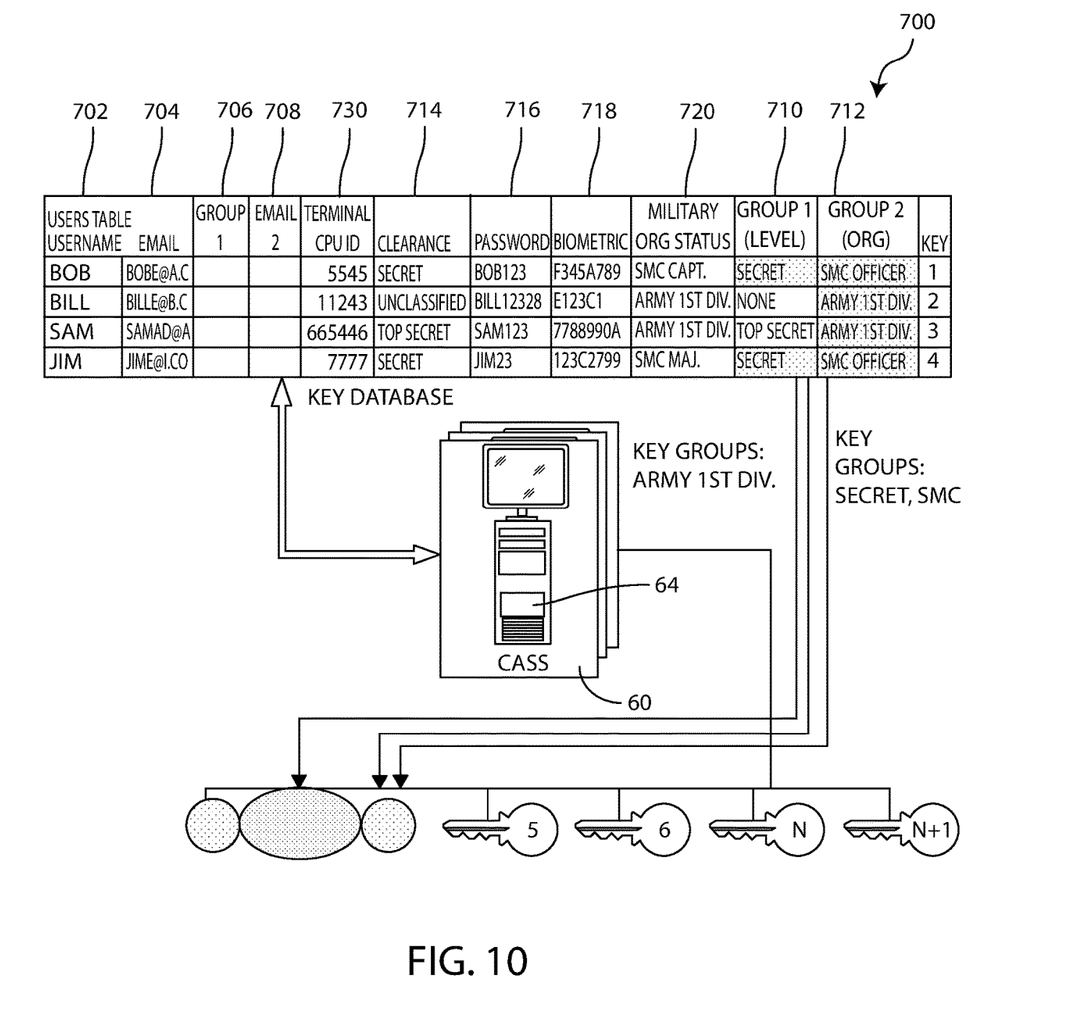
FIG. 10 is a chart illustrating assignment of a client to a group, creation of client ID group associations, and grouping of keys in object level encryption.

FIG. 10 is a chart 700 illustrating assignment of a client to a group in object level encryption. In embodiments comprising the arrangement of FIG. 10 a group of clients is authenticated as a single client. Grouping keys are produced by creating a group public ID. Names of individual clients are listed in column 702. In column 704, individual clients are identified by e-mail address. Columns 706 and 708 identify first and second groups and define the group to which a client in column 702 is assigned. The database 64 (FIG. 2) may use MySQL for Oracle SQL, for example. Group associations are used by the OLE protocol to provide access to groups such as those identified in columns 706 and 708 and to the clients respectively assigned to each group.

A spreadsheet representation of a database can be built into a larger SQL database and used to authenticate or deny Headers based on meeting group accept/reject criteria. Further attributes are selected to define the Security Policy of this embodiment. Column 710, entitled Group 1, lists levels of security clearance each defining one group. Classification levels include unclassified or none, secret, and top secret. Column 712, entitled Group 2, lists clients by organization. A column 714 lists security clearance level of each client. In the present illustration, the attribute is classification level.

In the present embodiment, further attributes that have been selected include password in column 716, biometric ID in column 718, and military organization status in column 720.

Because the data above are included in the database 10 (FIG. 1), public and private identity variables and group associations are effectively cross referenced along with group associations. The key database combined with the OLE authentication protocol can then be used to allow/deny access to encrypted data based on the Group Association(s). One individual or hardware terminal may be easily removed from a Group by making authorized changes to the database.

The security server 60 provides authentication, session key transfer, and key registration. The security server 60 is a database using an OLE protocol and provides normal database functions. Normal database functions include add/delete authorization, track transactions, and implement policy.

Figure 11:
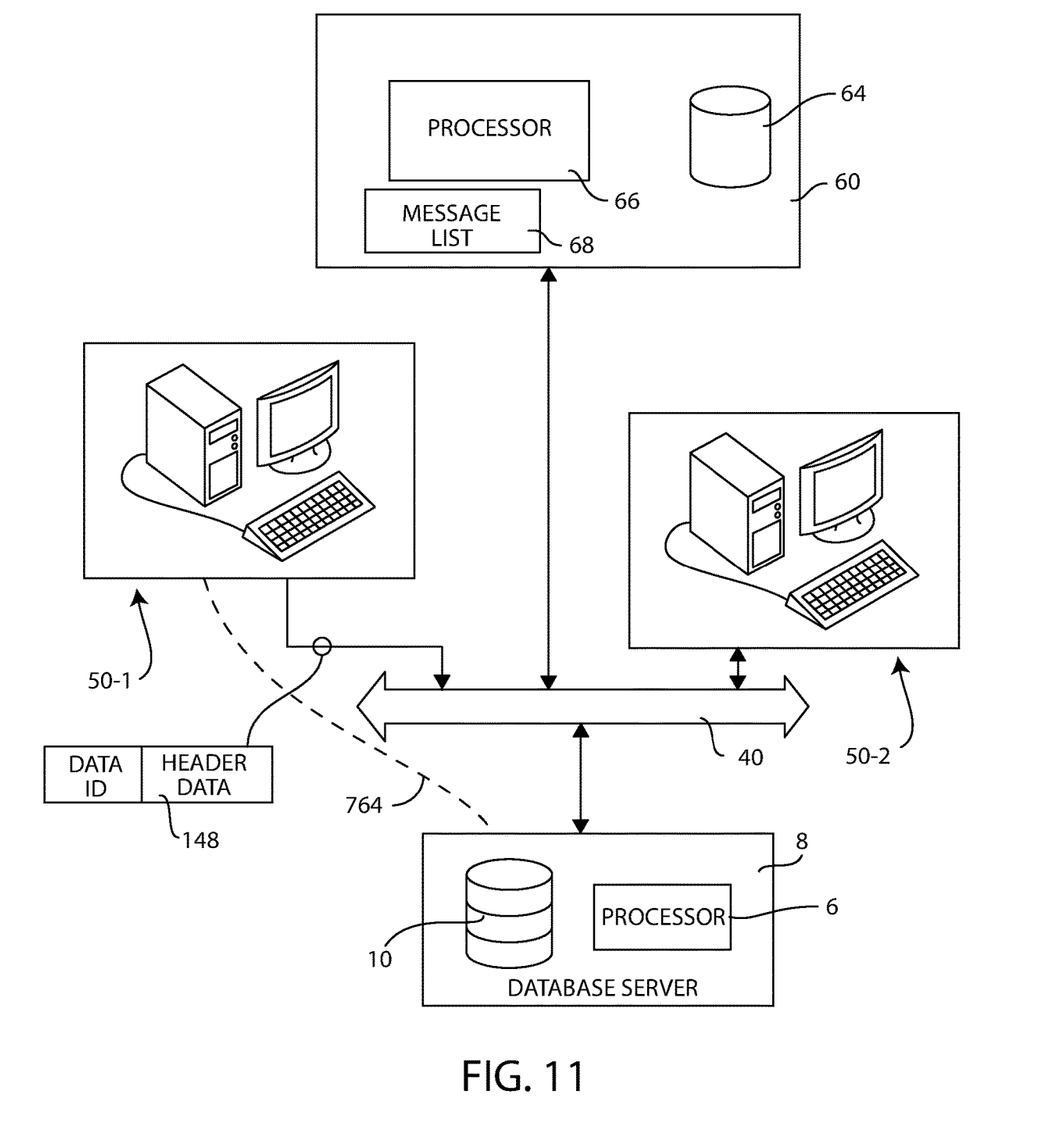
FIG. 11 is a block diagram illustrating an embodiment in which access to a unique data package can be controlled even after the package has been delivered to the relational database.

FIG. 11 is a block diagram illustrating an embodiment in which access to a unique data package can be controlled even after the package is delivered to the database 10. In this embodiment, a Data ID number 760 is added into the data structure 148 (FIG. 4) for inclusion into the Header-Tx 140 as a Security Policy Variable. This enables implementation of control of individual data packages directly from the transmitter ID or by a trusted administrator having access to the data structure 148. The Data ID number 760 is stored by the processor 102 for later use. Once a data package is determined to be deemed to be revoked, the processor 102 can send an OLE cryptographically secure message to the security server 60 with the Data ID number 760 and a code to revoke the message. The security server 60 can then store this data control "command" and reject authentication anytime that an individual data package is requested to be authenticated.

Operation proceeds as in FIG. 3. However, the object level encryption protocol is modified to include the additional data ID number 760. The Data ID number 760 is an additional parameter that must be looked up. Once the Data ID number 760 is looked up, it is compared to a security server Message List 68 to determine if the particular message has been commanded to be revoked. If not revoked, the key K(session) is sent as in FIG. 3. If the authorization for the message has been revoked, then non-authentication is indicated. The key is not sent.

The OLE process/protocol is modified and an additional communication link step is provided between the processor 102 and the security server 60. This additional operation is shown by arrow 764 in FIG. 11. The authentication comparison will determine if the message is still "valid" based on the inclusion of the Data ID number. The Data ID number can be added at any time after the initial data structure 148 was created. The Data ID can be used for security server 60 notification of a request for decryption of secure data. If the Data ID number has not been revoked and all other OLE authentication steps were determined to be acceptable, the session key K(session) is authorized and sent using the standard OLE process.

Many different forms of the present subject matter can be implemented in accordance with the above teachings.

Control of the data can be augmented by using a client hardware/software application design that only acts as a "viewer" to the receiver client and does not allow the decrypted data to be stored after decryption. In this application of OLE, the receiver client only is able to display the data. When the application or file is closed, it is stored only in its OLE encrypted state.

The OLE technology can be implemented into a number of different system types, providing encrypted security for different classes of data in respective applications. Examples of system types include, but are not limited to, computer, cell phone, modem, local area networks, IoT (Internet of Things) network, and online stores. Examples of data and systems include, but are not limited to, encrypted data streams (data in motion), encrypted files (data at rest), secure microprocessors in which the software is encrypted uniquely for each microprocessor and decrypted only inside the microprocessor, encrypted e-mail messages and/or their attachments, encrypted database fields, encrypted ad-hoc wireless networks, encryption co-processor chips, encrypted text messages and/or their attachments, encrypted video files, and encrypted web browsers.

An individualized encryption key can be provided for each hardware unit. A security policy may be defined by providing additional authentication variables for each hardware unit. These include processor, computer, phone or modem ID, time of day, personal identity of a user node, and the physical location of a user node.

Individualized encryption keys may be provided for all user nodes. Individualization may be provided by specifying additional authentication variables for each hardware unit, such as processor, terminal or modem ID, controlled time of usage, controlled hardware usage, or controlled location allowed for usage.

The object level encryption system has the capability to secure voice, video, or data such as messages, e-mails, digital files of any type including, communication streams in which data becomes a session key that is used to set up a Virtual Private Network (VPN) session, software and/or firmware into hardware processing platforms, and attachments to any message type. Authorization to access data may be provided to individual users or groups of users. Each group member is associated with a processor at the group member's user node comprising a plurality of personnel. CASS database key management is used to add or delete members of a group. Removal and addition of personnel and respective processors is achieved without re-encrypting and distributing data. Data may comprises a single object or comprise selected objects grouped together to meet a common need of group members. Where the data is secured once for the selected ACL group(s), it can be copied to any group member. Each accepted member of the group can be allowed access using the individual client(s) to group association(s) to accept/reject access to the data through control of the session key. Revoking access to secured data can be triggered by notifying the security server that an individual message is to be revoked even after it has been sent.

Security policy is defined by preselected variables embedded into encrypted data as parameters used in authentication. Additional variables can be added later. The security server system can store standard database reports of authentications, detection of errors, detection of unauthorized access attempts, and automatic policy actions.

The foregoing detailed description of the invention has been presented for purposes of illustration and description. It is not intended to be exhaustive or to limit the invention to the precise form disclosed. Many modifications and variations are possible in light of the above teachings. The described embodiments were chosen in order to best explain the principles of the present subject matter and its practical application to thereby enable others skilled in the art to best utilize the present subject matter in various embodiments and with various modifications as are suited to the particular use contemplated. It is intended that the scope of the invention be defined by the claims appended hereto as interpreted under current authority.

The invention claimed is:

1. A method for key management for an object level encrypted database comprising:
 a. forming an object wherein each object comprises at least one complete cell in the database and wherein each cell is the contents of a memory location, and encrypting each object individually to provide an encrypted data object and placing the encrypted data object in a processor in a first user node;
 b. creating a set of access criteria, each set comprising at least one of an authentication criterion and an authorization criterion and incorporating the access criteria with the object;
 c. creating a session key in the processor;
 d. creating a transmission key for encrypting information in a transmission header;
 e. encrypting the data object with the session key to provide a secure data object;
 f. at the first user node, constructing the header, the header including the session key, an identity of an authorized receiver, and message security variables;
 g. combining the header and the secure data object to form a transmission packet;
 h. transmitting the transmission packet to an object level database;
 i. registering the transmission key at a security server;
 j. creating a receiver key for encrypting information in a receiver header in a package transmitted to the security server and registering the receiver key in the security server;
 k. in response to a request at the object level database for access to selected cells from the second user node coupling the receiver key included in the request for comparison to the registered receiver key;
 l. at the security server reading the identity of an authorized receiver from the heading;
 m. comparing the receiver key from the requesting user node to the registered receiver key and in response to authentication providing the session key to the second user node; and
 n. in response to a successful authentication, sending a signal from the security server to the object database authorizing release of requested information to the second user node.

2. A method for key management for an object level encrypted database according to claim 1 selectively comprising accessing one cell to define a cell range or a plurality of cells to define a cell range and generating different keys for each cell range.

3. A method for key management for an object level encrypted database according to claim 1 further comprising creating a preselected group of authentication parameters at the first user node.

4. A method for key management for an object level encrypted database according to claim 1 wherein the access criteria include at least an authorization criterion and at least an authentication criterion.

5. A method for key management for an object level encrypted database according to claim 3 comprising forming a plurality of encrypted data objects.

6. A method for key management for an object level encrypted database according to claim 4 further comprising providing unencrypted data objects.

7. A method for key management for an object level encrypted database according to claim 5 further comprising assigning to each object a corresponding cell in the object level encrypted database and encoding the object with one key irrespective of the number of fields within a cell.

8. A method for key management for an object level encrypted database according to claim 1 further comprising transmitting the session key from the security server to the requesting user node via secure transmission to enable decryption of data received from the database.

9. A method for key management for an object level encrypted database according to claim 8 further comprising decrypting the session key at the security server and sending the session key to the requesting node via secure transmission.

10. A method for key management for an object level encrypted database according to claim 9 further comprising processing data requests at the database server.

* * * * *